United States Patent
Wulan

(10) Patent No.: US 11,085,334 B2
(45) Date of Patent: Aug. 10, 2021

(54) EXHAUST STEAM WASTE HEAT RECOVERING AND SUPPLYING SYSTEM OF AIR-COOLING UNITS IN LARGE THERMAL POWER PLANTS

(71) Applicant: Uni-Rising(Beijing) Technology Co., Ltd., Beijing (CN)

(72) Inventor: Qiqige Wulan, Beijing (CN)

(73) Assignee: Uni-Rising(Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 16/742,926

(22) Filed: Jan. 15, 2020

(65) Prior Publication Data

US 2020/0149433 A1 May 14, 2020

Related U.S. Application Data

(63) Continuation of application No. PCT/CN2019/083081, filed on Apr. 17, 2019.

(30) Foreign Application Priority Data

Apr. 19, 2018 (CN) .......................... 201810351231.5

(51) Int. Cl.
*F01K 7/34* (2006.01)
*F01K 9/00* (2006.01)
(Continued)

(52) U.S. Cl.
CPC ................ *F01K 7/34* (2013.01); *F01K 9/003* (2013.01); *F01K 11/02* (2013.01); *F01K 21/00* (2013.01); *F22D 11/06* (2013.01)

(58) Field of Classification Search
CPC . F01K 7/34; F01K 9/003; F01K 11/02; F01K 21/00; F01K 7/42; F01K 7/44;
(Continued)

(56) References Cited

U.S. PATENT DOCUMENTS

| 3,820,333 | A | * | 6/1974 | Tidball et al. | ............ F01K 7/34 60/667 |
| 4,004,424 | A | * | 1/1977 | Maddagiri | .............. F01K 9/003 60/646 |
| 2016/0348540 | A1 | * | 12/2016 | Edel | ........................ F01K 17/06 |

FOREIGN PATENT DOCUMENTS

| CN | 204404310 | 6/2015 |
| CN | 107202356 | 9/2017 |

(Continued)

*Primary Examiner* — Hoang M Nguyen
(74) *Attorney, Agent, or Firm* — JCIP Global Inc.

(57) ABSTRACT

The present application relates to an exhaust steam waste heat recovering and supplying system used for air-cooling units in large thermal power plants. Each of the two steam turbines has independent exhaust steam extraction system, and the exhaust steam extraction system of each steam turbine is connected with corresponding pre-condenser to heat the return water of the heating network. The exhaust steam extraction system of each steam turbine is further connected with the corresponding steam ejector; the exhaust port of each steam is connected with the corresponding steam ejector condenser to heat the return water of the heating network. The exhaust steam waste heat of the air-cooling units in a thermal power plant can be recycled in high efficiency to improve the utility rate of the exhaust steam, increase heating capacity, reduce cold end loss to the largest extent, and maximize the energy saving benefits.

9 Claims, 1 Drawing Sheet

(51) Int. Cl.
   *F01K 11/02*   (2006.01)
   *F01K 21/00*   (2006.01)
   *F22D 11/06*   (2006.01)

(58) Field of Classification Search
   CPC .......... F01K 7/38; F01K 17/025; F22D 11/06;
                Y02E 20/14; F24D 3/10; F24D 2200/16
   USPC .................................. 60/653, 654, 677–680
   See application file for complete search history.

(56) References Cited

FOREIGN PATENT DOCUMENTS

| | | |
|---|---|---|
| CN | 107218093 | 9/2017 |
| CN | 107621002 | 1/2018 |
| CN | 107687663 | 2/2018 |
| CN | 108644860 | 10/2018 |
| JP | 2011196191 | 10/2011 |

\* cited by examiner

EXHAUST STEAM WASTE HEAT RECOVERING AND SUPPLYING SYSTEM OF AIR-COOLING UNITS IN LARGE THERMAL POWER PLANTS

CROSS REFERENCE TO RELATED APPLICATIONS

This application is a continuation of international PCT application serial no. PCT/CN2019/083081, filed on Apr. 17, 2019, which claims the priority benefit of Chinese application no. 201810351231.5, filed on Apr. 19, 2018. The entirety of each of the above-mentioned patent applications is hereby incorporated by reference herein and made a part of this specification.

TECHNICAL FIELD

The invention belongs to the field of energy saving in power plants, in particular to an exhaust steam waste heat recovering and supplying system of air-cooling units in large thermal power plants.

BACKGROUND

It is well known that, the cold end loss of Rankine cycle in a thermal power plant accounts for more than 50% of the energy loss of the whole power plant. Therefore, it is the most potential in the field of energy saving and emission reduction of a power plant to recover and use the waste heat in the exhaust steam of a steam turbine to reduce the cold end loss.

For an air-cooling unit, a steam ejector-based exhaust steam waste heat recovering and supplying system of a steam turbine set has been primarily applied, which usually uses a steam ejector to pressurize the exhaust steam of a single steam turbine in the double steam turbines of the thermal power plant, which is connected to an external heating system for waste heat utilization. However, in the case of an extremely large heating area, the use of waste heat via pressurization after discharging the exhaust steam from the single steam turbine cannot fully meet the external heating demand. At the same time, the waste heat in the exhaust steam from the double steam turbines of the power plant is not fully utilized. Therefore, it is necessary to further build a more proper heat-supplying thermal system according to the actual situations of the power plant and corresponding heating areas thereof, so that the amount of the exhaust steam from the whole thermal power plant can be utilized by the exhaust steam waste heat recovering and supplying system, so as to improve the effect of energy saving, which at present is a problem that has to be solved in an exhaust steam waste heat recovering and supplying project.

BRIEF SUMMARY

An object of the present application is to provide an exhaust steam waste heat recovering and supplying system of air-cooling units in large thermal power plants, especially used for an extremely large external heating area.

An exhaust steam waste heat recovering and supplying system used for air-cooling units in large thermal power plants is provided, in which the air-cooling units in large thermal power plants comprises a first steam turbine and a second steam turbine and the corresponding condensing devices thereof, and the first steam turbine and second steam turbine respectively have a first turbine low-pressure cylinder and a second turbine low-pressure cylinder, each of which is connected with the corresponding condensing device via an exhaust pipe; the exhaust steam waste heat recovering and supplying system comprises a first exhaust steam extraction system and a second exhaust steam extraction system and corresponding first and second steam ejector, pre-condenser, and steam ejector condenser thereof, in which the turbine exhaust steam is extracted by using the exhaust steam extraction systems; the two steam turbines have their own independent exhaust steam extraction system, in which the exhaust steam extraction system of each steam turbine is connected with the corresponding pre-condenser via an exhaust steam extraction pipeline, with a shell side of the pre-condenser being fed with the turbine exhaust steam for properly increasing the back pressure and a water side being fed with return water of a heating network so that the return water of the heating network is heated via steam-water heat exchange; the exhaust steam extraction pipeline of each steam turbine is further connected to a suction steam inlet of the corresponding steam ejector, and a heating steam extraction pipe of the steam turbines is connected with motive steam inlets of the steam ejectors, so as to perform pressurization by using the heating steam extracted by the heating steam extraction pipe; and an exhaust port of each steam turbine is connected to the corresponding steam ejector condenser thereof, with a shell side of the steam ejector condenser being fed with pressurized exhaust steam and a water side thereof being fed with the return water of the heating network so that the return water of the heating network is heated by the steam-water heat exchange.

By adopting the above technical solution, the parameters of the whole thermal power plant can be optically matched, so as to achieve optimized operation mode, improved utility rate of the exhaust steam, increased heating capacity, extremely reduced cold end loss, and maximized energy saving benefits.

Figure 1:
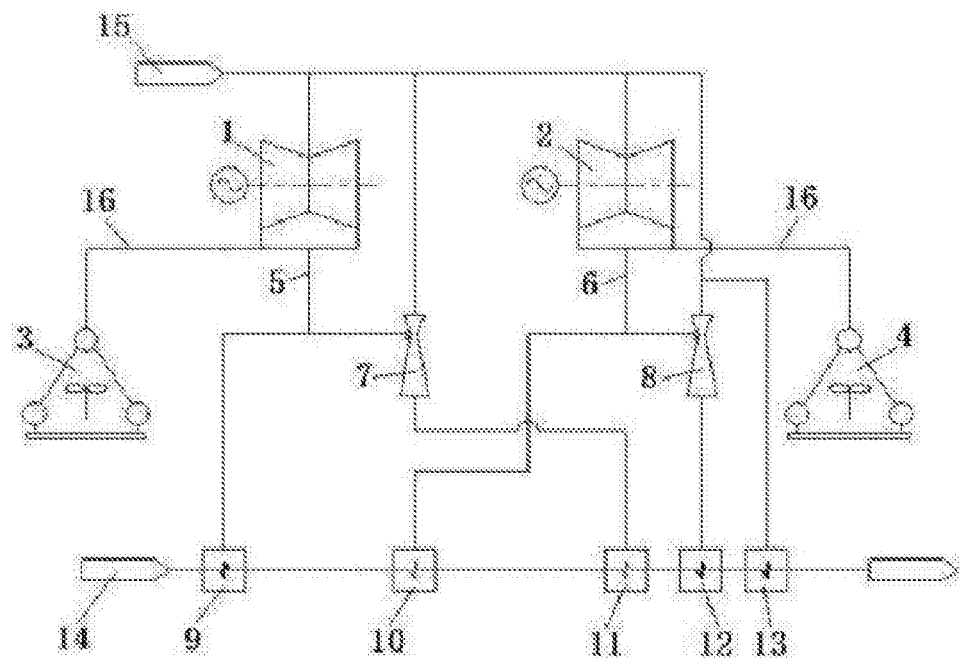
FIG. 1 shows Embodiment 1 of the exhaust steam waste heat recovering and supplying system of the air-cooling units in a large thermal power plant.

The reference numbers refer to: 1. the first turbine low-pressure cylinder; 2. the second turbine low-pressure cylinder; 3. the first direct air-cooling unit (or the condenser of an indirect air-cooling unit); 4. the second air-cooling island (or the condenser of an indirect air-cooling unit); 5. the first exhaust steam extraction system; 6. the second exhaust steam extraction system; 7. the first steam ejector; 8. the second steam ejector; 9. the first pre-condenser; 10. the second pre-condenser; 11. the first steam ejector condenser; 12. the second steam ejector condenser; 13. heating network heater; 14. heating network water system; 15. heating steam extraction pipe; and 16. exhaust pipe.

DETAILED DESCRIPTION

The present application will be further described below in connection with the accompanying drawings. It should be understood that the content described herein is only used to describe and interpret the present application, rather than imposing a limitation thereto.

The air-cooling unit of a large thermal power plant comprises a first and a second steam turbines and corresponding first and second direct air-cooling units (or condensers of indirect air-cooling units) thereof. The first and the second steam turbines are respectively equipped with a first and a second turbine low-pressure cylinders, which are respectively connected with a first and a second direct air-cooling units (or the condensers of indirect air-cooling units) through one exhaust pipe. An exhaust steam waste heat recovering and supplying system is constructed, in which the exhaust steam is extracted from an opening on the exhaust pipe of the two connected direct air-cooling units (or the condenser throat of indirect air-cooling units) by using an exhaust steam extraction system. Each of the two steam turbines has its own independent exhaust steam extraction system, and the exhaust steam extraction system of each steam turbine is connected to a corresponding (exhaust steam) pre-condenser through one exhaust steam extraction pipeline, with the shell side of the pre-condenser being fed with turbine exhaust steam for properly increasing back pressure and the water side being fed with return water of the heating network so that the return water of the heating network can be heated via steam-water heat exchange. The exhaust steam extraction pipeline of each steam turbine is further connected to the suction steam inlet of the corresponding steam ejector thereof, and the heating steam extraction pipes of the steam turbines are connected to the motive steam inlets of the steam ejectors, for performing pressurization by using the exhaust steam extraction of the heating steam extraction pipe. The exhaust port of each steam turbine is connected to corresponding steam ejector condenser thereof, with the shell side being fed with pressurized exhaust steam and the water side being fed with return water of the heating network so that the return water of the heating network can be heated via steam-water heat exchange.

The heating steam extraction pipes of the steam turbines are further connected with the heating network heater.

The heating steam is extracted from the two steam turbines, that is, the corresponding steam turbine in which the exhaust steam is recycled and the other adjacent turbine. The heating steam can also be the exhaust steam from a medium pressure cylinder.

The exhaust steam extraction system comprises a special exhaust steam extraction part and an exhaust extraction pipeline. The special exhaust steam extraction part is mounted on the opening site of the exhaust pipe of the direct air-cooling units (or the condenser throat of indirect air-cooling units). The exhaust steam extraction system can further comprise an exhaust steam header connected between the exhaust steam extraction pipelines of the two steam turbines, on which a regulating valve is provided. Different operation modes of combining or isolating the two exhaust steam extraction pipelines can be achieved by opening or closing the regulating valve.

For the heating network system, a multi-stage heating mode is adopted for the return water of the heating network, in which a plurality of stages of heating condensers are sequentially connected. The heating condenser is a steam-water heat exchanging structure, comprising a plurality of pre-condensers, a plurality of steam ejector condensers and a heating network heater. By using the low-pressure exhaust steam having different back pressures, pressurizing the exhaust steam, extracting the steam for heating, and properly arranging the connection order of the multi-stage heating condensers, gradient heating of the return water of the heating network can be achieved, so that the exhaust steam waste heat of the thermal power plant can be fully utilized.

The exhaust steam outlet of the first steam turbine is connected with a first pre-condenser, while being connected with a first steam ejector condenser via a first steam ejector, where the exhaust pressure of the first steam ejector is higher than the exhaust steam pressure of the first steam turbine. The exhaust steam outlet of the second steam turbine is connected with a second pre-condenser, while being connected with a second steam ejector condenser via a second steam ejector, where the exhaust pressure of the second steam ejector is higher than the exhaust steam pressure of the second steam turbine.

The exhaust pressure of the second steam ejector is higher than that of the first steam ejector. In particular, the exhaust steam pressure of the first steam turbine is the same as or lower than that of the second steam turbine. The pressure increasing ratios of the two steam ejectors can be identical or different. The steam ejectors can adopt an adjustable structure or a fixed structure.

If the exhaust steam pressure of the second steam turbine is lower than the exhaust pressure of the first steam ejector, the following connection order of the multi-stage heating condensers can be adopted: the first pre-condenser, the second pre-condenser, the first steam ejector condenser, the second steam ejector condenser, and the heating network heater.

If the exhaust steam pressure of the second steam turbine is higher than exhaust pressure of the first steam ejector, the following connection order of the multi-stage heating condensers can be adopted: the first pre-condenser, the first steam ejector condenser, the second pre-condenser, the second steam ejector condenser, and the heating network heater.

A valve regulating system capable of performing flow-direction switching control can be further provided.

Figure 2:
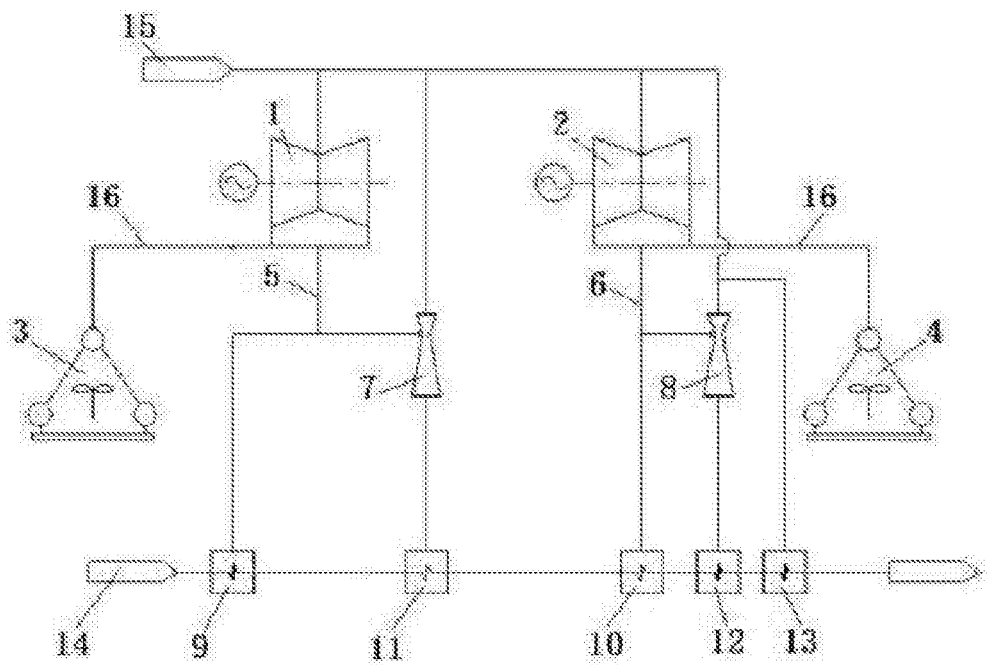
FIG. 2 shows Embodiment 2 of the exhaust steam waste heat recovering and supplying system of the air-cooling units in a large thermal power plant.

The valve regulating system (not shown) can be configured as follow. Firstly, the first steam ejector condenser and the second pre-condenser is sequentially connected; two pipelines are led out from the water-side inlet end of the first steam ejector condenser and are respectively connected with the water-side outlet of the first pre-condenser and the water-side inlet of the second steam ejector condenser; and two pipelines are led out from the water-side outlet end of the second pre-condenser and similarly are respectively connected with the water-side outlet of the first pre-condenser and the water-side inlet of the second steam ejector condenser. Regulating valves are respectively mounted on the four pipelines, and can be opened or closed to control the flow-direction switching of the water in the heating network passing through the first steam ejector condenser and the second pre-condenser, in which the water in the heating network flows into the second pre-condenser and flows out of the first steam ejector condenser in Embodiment 1 (as shown in FIG. 1), or the water in the heating network flows into the first steam ejector condenser and flows out of the second pre-condenser in Embodiment 2 (as shown in FIG. 2). Different operation modes of the system can be flexibly configured on site based on the change in the pressure of the low-pressure exhaust steam and pressurized exhaust steam due to the parameter adjustment of the two steam turbines and the two steam ejector condensers.

Regulating valves are provided on individual steam pipelines of the steam ejectors and individual circulating water pipelines of the heating network, for regulating or closing the operation of the system. Individual stages of the heating condensers are provided with a parallel bypass pipeline so as to achieve independent operation or closing of each stage.

Embodiment 1: As Shown in FIG. 1

Two 330MW direct air-cooling units were installed in a thermal power plant.

External heating area was 23,000,000 m², the temperature of the return water of the heating network was 25-40° C., the temperature of the supplied water was 120° C., and the water amount of the heating network was 10500 t/h. The parameters of the heating steam extraction were 0.2-0.4 MPa·a and 233° C. (the above parameters are examples provided merely for the convenience of description. The other way of setting the parameters also falls within the scope of the present application).

The actual situation of the thermal power plant and the heating areas lied in that, the heating area of the heating network was extremely large, the temperature of the return water of the heating network was 25-40° C., and the temperature of supplied water was 120° C. This thermal power plant was the heat source point of the urban heat-supply, and the first station heat thereof was primarily sourced from: 1. the exhaust steam waste heat of two 330MW direct air-cooling units of the thermal power plant; and 2. heating steam extracted from the two 330 MW direct air-cooling units of the thermal power plant.

The exhaust steam waste recovering and supplying system of the air-cooling units in the large thermal power plant comprises two steam turbines, two corresponding air-cooling units, an exhaust steam extraction system, a first pre-condenser, a second pre-condenser, a first steam ejector, a second steam ejector, a first steam ejector condenser, and a second steam ejector condenser. By using the exhaust steam extraction system, the exhaust steam was extracted respectively from the openings on the exhaust pipes of the two connected direct air-cooling units, and sent to the steam ejectors or the pre-condensers via pipelines. The back pressures of the two steam turbines in operation were different from each other. The recycled water pipeline of the heating network was sequentially led to the first pre-condenser, the second pre-condenser, the first steam ejector condenser, the second steam ejector condenser, and the heating network heater so that the recycled water was heated.

During supplying heat in winter, the two steam turbines were operated at different back pressures, that is, a high back pressure turbine and a low back pressure turbine, respectively. For example, one of the two steam turbines was operated at a back pressure of 10.5 KPa·a (corresponding to a saturated temperature of 46.75° C.), and the other was operated at a back pressure of 15 KPa·a (corresponding to a saturated temperature of 54° C.) (10.5 KPa·a and 15 KPa·a were merely examples provided for the convenience of description. The other way of setting the parameters also falls within the scope of the present application). The exhaust steam of the two steam turbines were recycled by using the steam ejector system.

By using the exhaust steam extraction system, the exhaust steam, that is, the exhaust steam of the two direct air-cooling units, was extracted from the openings on the exhaust pipe of the first stage steam turbine of 330 MW and the exhaust pipe of the second stage steam turbine of 330 MW, respectively. The exhaust steam extraction system comprises a special exhaust steam extraction part, an exhaust steam extraction pipeline, and an exhaust steam header.

The first exhaust steam extraction pipeline was connected with the steam side of the first pre-condenser and the suction steam inlet of the first steam ejector; and the second exhaust steam extraction pipe was connected with the steam side of the second pre-condenser and the suction steam inlet of the second steam ejector.

The heating steam extraction pipe of the team turbine was connected with the motive steam inlets of the two steam ejectors; the exhaust steam extraction pipelines were respectively connected with the suction steam inlet of corresponding steam ejectors; and the exhaust port of the first steam ejector was connected with the first steam ejector condenser, and the exhaust port of the second steam ejector was connected with the second steam ejector condenser.

The motive steam pressure of the first steam ejector was 0.2-0.4 MPa·a (at a temperature of 233° C.), the ejected steam pressure of the first steam ejector was 10.5 KPa·a (at a temperature of 46.75° C.), and the exhaust steam pressure of the first steam ejector was 20 KPa·a.

The motive steam pressure of the second steam ejector was 0.2-0.4 MPa·a (at a temperature of 233° C.), the ejected steam pressure of the second steam ejector was 15 KPa·a (at a temperature of 54° C.), and the exhaust steam pressure of the second steam ejector was 31 KPa·a.

The steam ejectors adopted an adjustable structure or a fixed structure.

The heating steam was extracted from the corresponding steam turbine in which the exhaust steam was recycled and the other adjacent steam turbine.

Regulating valves were provided on the steam pipelines of the steam ejectors and the recycled water pipelines of the heating network, for regulating or closing the operation of the system.

The recycled water of the heating network having a return water temperature of 25-40° C. was sequentially flowed through the first pre-condenser, the second pre-condenser, the first steam ejector condenser, the second steam ejector condenser, and the heating network heater. The water temperature of the heating network reached 45° C. after passing through the first pre-condenser; the water temperature of the heating network reached 52.5° C. after passing through the second pre-condenser; the water temperature of the heating network reached 58.5° C. after passing through the first steam ejector condenser; the water temperature of the heating network reached 68.3° C. after passing through the second steam ejector condenser; and the water temperature of the heating network reached 120° C. after passing through the heating network heater. The recycled water of the heating network reaching 120° C. after the multi-stage heating was sent to the municipal pipe network.

Embodiment 2: As Shown in FIG. 2

Two 330 MW direct air-cooling units were installed in a thermal power plant.

External heating area was 23,000,000 m², the temperature of the return water of the heating network was 25-40° C., the temperature of the supplied water was 120° C., and the water amount of the heating network was 10500 t/h. The parameters of the heating steam extraction were 0.2-0.4 MPa·a and 233° C. (the above parameters are examples provided merely for the convenience of description. The other way of setting the parameters also falls within the scope of the present application).

The actual situation of the thermal power plant and the heating areas lied in that, the heating area of the heating network was extremely large, and the heating network involved in large temperature difference heat supplying. This thermal power plant was the heat source point of the urban heat-supply, and the first station heat thereof was primarily sourced from: 1. the exhaust steam waste heat of two 330 MW direct air-cooling units of the thermal power plant; and 2. heating steam extracted from the two 330 MW direct air-cooling units of the thermal power plant.

The exhaust steam waste recovering and supplying system of the air-cooling units in the large thermal power plant comprises two steam turbines, two corresponding air-cooling units, an exhaust steam extraction system, a first pre-condenser, a second pre-condenser, a first steam ejector, a second steam ejector, a first steam ejector condenser, and a second steam ejector condenser. By using the exhaust steam extraction system, the exhaust steam was extracted respectively from the openings on the exhaust pipes of the two connected direct air-cooling units, and sent to the steam ejectors or newly added pre-condensers via pipelines. The back pressures of the two steam turbines in operation were different from each other. The recycled water pipeline of the heating network was sequentially led to the first pre-condenser, the first steam ejector condenser, the second pre-condenser, the second steam ejector condenser, and the heating network heater so that the recycled water was heated.

During supplying heat in winter, the two steam turbines were operated at different back pressures, that is, a high back pressure turbine and a low back pressure turbine, respectively. For example, one of the two steam turbines was operated at a back pressure of 10.5 KPa·a (corresponding to a saturated temperature of 46.75° C.), and the other was operated at a back pressure of 28 KPa·a (corresponding to a saturated temperature of 67.5° C.) (10.5 KPa·a and 28 KPa·a were merely examples provided for the convenience of description. The other way of setting the parameters also falls within the scope of the present application). The exhaust steam of the two steam turbines were recycled.

By using the exhaust steam extraction system, the exhaust steam, that is, the exhaust steam of the two direct air-cooling units, was extracted from the openings on the exhaust pipe of the first stage steam turbine of 330 MW and the exhaust pipe of the second stage steam turbine of 330 MW, respectively. The exhaust steam extraction system comprises a special exhaust steam extraction part, an exhaust steam extraction pipeline, and an exhaust steam header.

The first exhaust steam extraction pipeline was connected with the steam side of the pre-condenser and the suction steam inlet of the first steam ejector; and the second exhaust steam extraction pipe was connected with the steam side of the second pre-condenser and the suction steam inlet of the second steam ejector.

The heating steam extraction pipe of the team turbine was connected with the motive steam inlets of the two steam ejectors; the exhaust steam extraction pipelines were respectively connected with the suction steam inlet of corresponding steam ejectors; and the exhaust port of the first steam ejector was connected with the first steam ejector condenser, and the exhaust port of the second steam ejector was connected with the second steam ejector condenser.

The motive steam pressure of the first steam ejector was 0.2-0.4 MPa·a (at a temperature of 233° C.), the ejected steam pressure of the first steam ejector was 10.5 KPa·a (at a temperature of 46.75° C.), and the exhaust steam pressure of the first steam ejector was 20 KPa·a.

The motive steam pressure of the second steam ejector was 0.2-0.4 MPa·a (at a temperature of 233° C.), the ejected steam pressure of the second steam ejector was 28 KPa·a (at a temperature of 67.5° C.), and the exhaust steam pressure of the second steam ejector was 48 KPa·a.

The steam ejectors adopted an adjustable structure or a fixed structure.

The heating steam was extracted from the corresponding steam turbine in which the exhaust steam was recycled and the other adjacent steam turbine.

Regulating valves were provided on the steam pipelines of the steam ejectors and the recycled water pipelines of the heating network, for regulating or closing the operation of the system.

The recycled water of the heating network having a return water temperature of 25-40° C. was sequentially flowed through the first pre-condenser, the first steam ejector condenser, the second pre-condenser, the second steam ejector condenser, and the heating network heater. The water temperature of the heating network reached 45° C. after passing through the first pre-condenser; the water temperature of the heating network reached 58.5° C. after passing through the first steam ejector condenser; the water temperature of the heating network reached 66° C. after passing through the second pre-condenser; the water temperature of the heating network reached 79° C. after passing through the second steam ejector condenser; and the water temperature of the heating network reached 120° C. after passing through the heating network heater. The recycled water of the heating network reaching 120° C. after the multi-stage heating was sent to the municipal pipe network.

Embodiment 3: As Shown in FIG. 1

Two 600 MW indirect air-cooling units were installed in a thermal power plant.

The heating area was 35,000,000 m$^2$, the temperature of the return water of the heating network was 25-40° C., the temperature of the supplied water was 120° C., and the water amount of the heating network was 15000 t/h. The parameters of the heating steam extraction were 0.2-0.4 MPa·a and 233° C. (the above parameters are examples provided merely for the convenience of description. The other way of setting the parameters also falls within the scope of the present application).

During supplying heat in winter, the two steam turbines were operated at different back pressures, that is, a high back pressure turbine and a low back pressure turbine, respectively. For example, one of the two steam turbines was operated at a back pressure of 10.5 KPa·a (corresponding to a saturated temperature of 46.75° C.), and the other was operated at a back pressure of 15 KPa·a (corresponding to a saturated temperature of 54° C.) (10.5 KPa·a and 15 KPa·a were merely examples provided for the convenience of description. The other way of setting the parameters also falls within the scope of the present application). The exhaust steam of the two steam turbines were recycled.

The motive steam pressure of the first steam ejector was 0.2-0.4 MPa·a (at a temperature of 233° C.), the ejected steam pressure of the first steam ejector was 10.5 KPa·a (at a temperature of 46.75° C.), and the exhaust steam pressure of the first steam ejector was 20 KPa·a.

The motive steam pressure of the second steam ejector was 0.2-0.4 MPa·a (at a temperature of 233° C.), the ejected steam pressure of the second steam ejector was 15 KPa·a (at a temperature of 54° C.), and the exhaust steam pressure of the second steam ejector was 31 KPa·a.

The recycled water of the heating network having a return water temperature of 25-40° C. was sequentially flowed through the first pre-condenser, the second pre-condenser, the first steam ejector condenser, the second steam ejector condenser, and the heating network heater. The water temperature of the heating network reached 45° C. after passing through the first pre-condenser; the water temperature of the heating network reached 52.5° C. after passing through the second pre-condenser; the water temperature of the heating network reached 58.5° C. after passing through the first steam ejector condenser; the water temperature of the heating network reached 68.3° C. after passing through the second steam ejector condenser; and the water temperature of the heating network reached 120° C. after passing through the heating network heater. The recycled water of the heating network reaching 120° C. after the multi-stage heating was sent to the municipal pipe network.

Embodiment 4: As Shown in FIG. 2

Two 600 MW indirect air-cooling units were installed in a thermal power plant.

The heating area was 35,000,000 m$^2$, the temperature of the return water of the heating network was 25-40° C., the temperature of the supplied water was 120° C., and the water amount of the heating network was 15000 t/h. The parameters of the heating steam extraction were 0.2-0.4 MPa·a and 233° C. (the above parameters are examples provided merely for the convenience of description. The other way of setting the parameters also falls within the scope of the present application).

During supplying heat in winter, the two steam turbines were operated at different back pressures, that is, a high back pressure turbine and a low back pressure turbine, respectively. For example, one of the two steam turbines was operated at a back pressure of 10.5 KPa·a (corresponding to a saturated temperature of 46.75° C.), and the other was operated at a back pressure of 28 KPa·a (corresponding to a saturated temperature of 67.5° C.) (10.5 KPa·a and 28 KPa·a were merely examples provided for the convenience of description. The other way of setting the parameters also falls within the scope of the present application). The exhaust steam of the two steam turbines were recycled.

The motive steam pressure of the first steam ejector was 0.2-0.4 MPa·a (at a temperature of 233° C.), the ejected steam pressure of the first steam ejector was 10.5 KPa·a (at a temperature of 46.75° C.), and the exhaust steam pressure of the first steam ejector was 20 KPa·a.

The motive steam pressure of the second steam ejector was 0.2-0.4 MPa·a (at a temperature of 233° C.), the ejected steam pressure of the second steam ejector was 28 KPa·a (at a temperature of 67.5° C.), and the exhaust steam pressure of the second steam ejector was 48 KPa·a.

The recycled water of the heating network having a return water temperature of 25-40° C. was sequentially flowed through the first pre-condenser, the second pre-condenser, the first steam ejector condenser, the second steam ejector condenser, and the heating network heater. The water temperature of the heating network reached 45° C. after passing through the first pre-condenser; the water temperature of the heating network reached 52.5° C. after passing through the second pre-condenser; the water temperature of the heating network reached 58.5° C. after passing through the first steam ejector condenser; the water temperature of the heating network reached 68.3° C. after passing through the second steam ejector condenser; and the water temperature of the heating network reached 120° C. after passing through the heating network heater. The recycled water of the heating network reaching 120° C. after the multi-stage heating was sent to the municipal pipe network.

Finally, it should be noted that the above description is only for the interpretation of the invention and is not used for limiting the present application. Although the invention has been described in detail, the above technical solutions can be modified, or some of the technical features can be equally substituted by those skilled in the art. Any modification, equivalent replacement, improvement, or the like made in the spirit and principle of the present application shall be included in the protection scope of the present application.

What is claimed is:

1. An exhaust steam waste heat recovering and supplying system used for air-cooling units in large thermal power plants, in which the air-cooling units in large thermal power plants comprises a first steam turbine and a second steam turbine, and the first steam turbine and the second steam turbine respectively have a first turbine low-pressure cylinder and a second turbine low-pressure cylinder respectively connected with a first air-cooling member and a second air-cooling member via an exhaust pipe; wherein the exhaust steam waste heat recovering and supplying system comprises:

a first exhaust steam extraction system and a second exhaust steam extraction system and corresponding first and second steam ejectors, first and second pre-condensers, and first and second steam ejector condensers thereof, in which turbine exhaust steam is extracted by using an exhaust steam extraction system;

each of the two steam turbines has its own independent exhaust steam extraction system, in which the exhaust steam extraction system of each steam turbine is connected with the corresponding pre-condenser via an exhaust steam extraction pipeline, with a shell side of the pre-condenser being fed with the turbine exhaust steam and a water side being fed with return water of a heating network so that the return water of the heating network is heated by steam-water heat exchange;

the exhaust steam extraction pipeline of each steam turbine is further connected with a suction steam inlet of the corresponding steam ejector, and a heating steam extraction pipe of the steam turbines is connected with motive steam inlets of the steam ejectors, so as to perform pressurization by using the exhaust steam extracted by the heating steam extraction pipe; and an exhaust port of each steam turbine is connected with the corresponding steam ejector condenser thereof, with a shell side of the steam ejector condenser being fed with the pressurized exhaust steam and a water side thereof being fed with the return water of the heating network so that the return water of the heating network is heated by the steam-water heat exchange.

2. The exhaust steam waste heat recovering and supplying system used for air-cooling units in large thermal power plants according to claim 1, wherein the first and second pre-condensers and the first and second steam ejector condensers are sequentially connected in series to form a multi-stage gradient heating system of the return water of the heating network.

3. The exhaust steam waste heat recovering and supplying system used for air-cooling units in large thermal power plants according to claim 1, wherein the exhaust steam extraction system of the first steam turbine is connected with the first pre-condenser, while being connected with the first steam ejector condenser via the first steam ejector, and an exhaust pressure of the first steam ejector is higher than an exhaust steam pressure of the first steam turbine; and the exhaust steam extraction system of the second steam turbine is connected with the second pre-condenser, while being connected with the second steam ejector condenser via the second steam ejector, and an exhaust pressure of the second steam ejector is higher than an exhaust steam pressure of the second steam turbine.

4. The exhaust steam waste heat recovering and supplying system used for air-cooling units in large thermal power plants according to claim 3, wherein the exhaust pressure of the second steam ejector is higher than the exhaust pressure of the first steam ejector; and the exhaust steam pressure of the first steam turbine is the same as or lower than the exhaust steam pressure of the second steam turbine.

5. The exhaust steam waste heat recovering and supplying system used for air-cooling units in large thermal power plants according to claim 3, wherein when the exhaust steam pressure of the second steam turbine is lower than the exhaust pressure of the first steam ejector, a multi-stage gradient heating system of the return water of the heating network has a connection order of the first pre-condenser, the second pre-condenser, the first steam ejector condenser, and the second steam ejector condenser.

6. The exhaust steam waste heat recovering and supplying system used for air-cooling units in large thermal power plants according to claim 3, wherein when the exhaust steam pressure of the second steam turbine is higher than the exhaust pressure of the first steam ejector, a multi-stage gradient heating system of the return water of the heating network has a connection order of the first pre-condenser, the first steam ejector condenser, the second pre-condenser, and the second steam ejector condenser.

7. The exhaust steam waste heat recovering and supplying system used for air-cooling units in large thermal power plants according to claim 2, wherein the multi-stage gradient heating system of the return water of the heating network further comprises a heating network heater, and the heating steam extraction pipeline of the steam turbines is connected with the heating network heater.

8. The exhaust steam waste heat recovering and supplying system used for air-cooling units in large thermal power plants according to claim 3, wherein a valve regulating system performing flow-direction switching control is provided in a multi-stage gradient heating system of the return water of the heating network, for switching a flow direction of the water in the heating network through the second pre-condenser and the first steam ejector condenser.

9. The exhaust steam waste heat recovering and supplying system used for air-cooling units in large thermal power plants according to claim 8, wherein the first steam ejector condenser and the second pre-condenser is sequentially connected; two pipelines are led out from the water-side inlet end of the first steam ejector condenser and are respectively connected with the water-side outlet of the first pre-condenser and the water-side inlet of the second steam ejector condenser; and two pipelines are led out from the water-side outlet end of the second pre-condenser and similarly are respectively connected to the water-side outlet of the first pre-condenser and the water-side inlet of the second steam ejector condenser; and regulating valves are respectively mounted on the four pipelines, and are opened or closed to control the flow-direction switching of the water in the heating network through the first steam ejector condenser and the second pre-condenser.

* * * * *